No. 648,318. Patented Apr. 24, 1900.
C. WATSON & A. G. LOTZ.
COFFEE ROASTING APPARATUS.
(Application filed Dec. 4, 1899.)
(No Model.) 2 Sheets—Sheet 2.

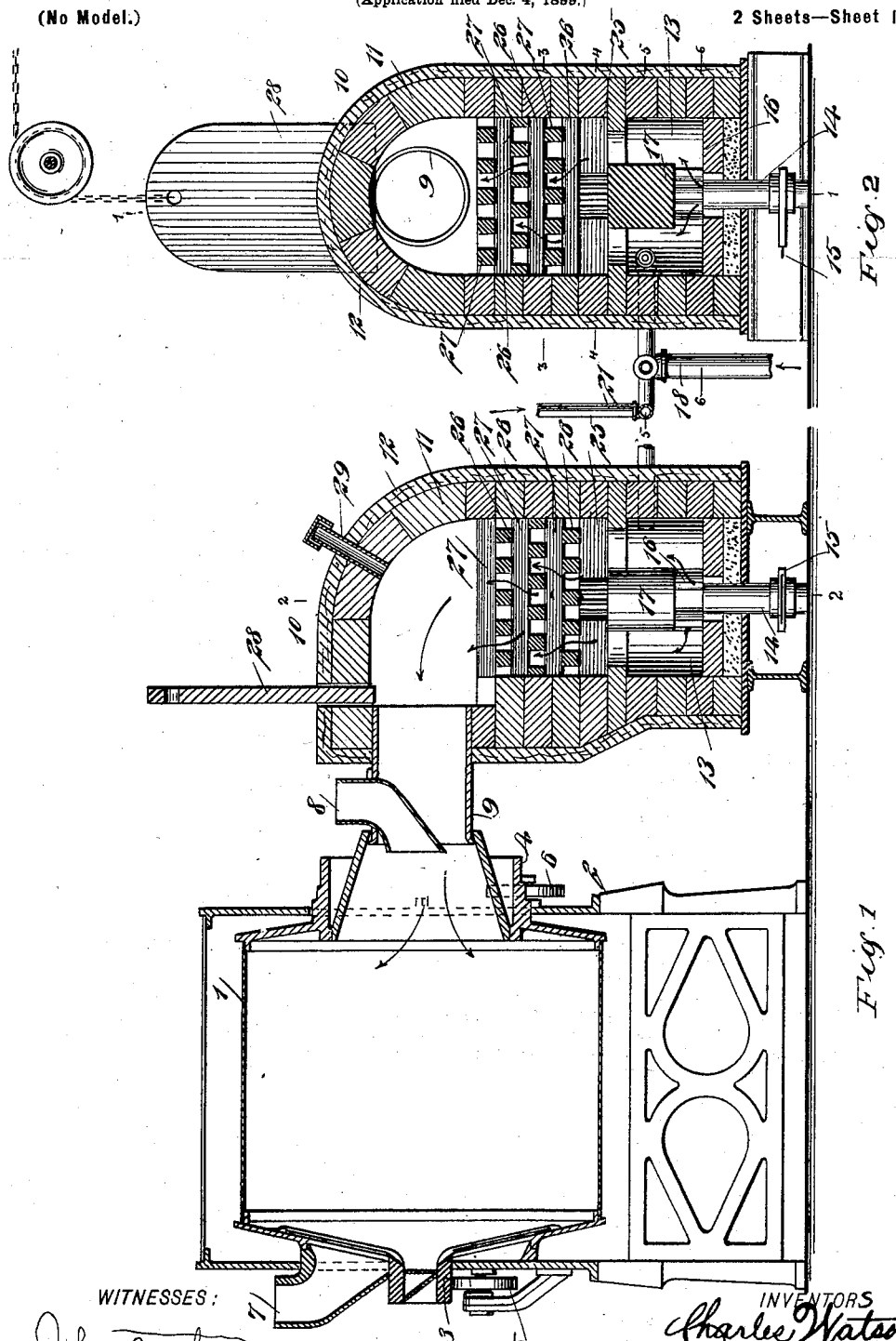

WITNESSES:
Joshua Bergstrom
J. R. Ferguson

INVENTORS
Charles Watson
Alver G. Lotz
BY
ATTORNEYS

UNITED STATES PATENT OFFICE.

CHARLES WATSON AND ALVER GOLDMAN LOTZ, OF NEW YORK, N. Y., ASSIGNORS TO THE AMERICAN COFFEE COMPANY, OF SAME PLACE.

COFFEE-ROASTING APPARATUS.

SPECIFICATION forming part of Letters Patent No. 648,318, dated April 24, 1900.

Application filed December 4, 1899. Serial No. 739,196. (No model.)

*To all whom it may concern:*

Be it known that we, CHARLES WATSON and ALVER GOLDMAN LOTZ, citizens of the United States, and residents of the city of New York, borough of Brooklyn, in the county of Kings and State of New York, have invented a new and Improved Apparatus for Roasting Coffee, of which the following is a full, clear, and exact description.

This invention relates particularly to improvements in furnaces for roasting coffee and the like; and the object is to provide a heater so constructed as to prevent flame from coming in direct contact with the coffee in the roaster, thus preventing possible burning and loss of the coffee or a portion thereof.

We will describe a coffee-roaster embodying our invention and then point out the novel features in the appended claims.

Reference is to be had to the accompanying drawings, forming a part of this specification, in which similar characters of reference indicate corresponding parts in all the figures.

Figure 3:
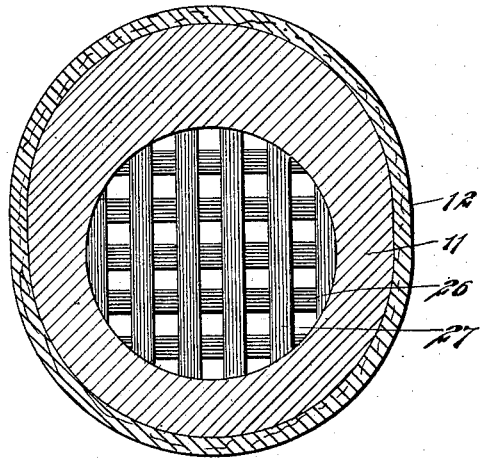
Figure 4:
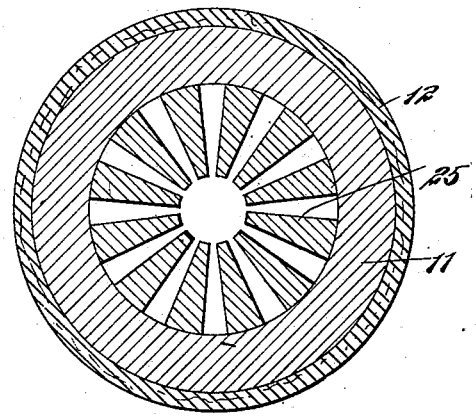
Figure 5:
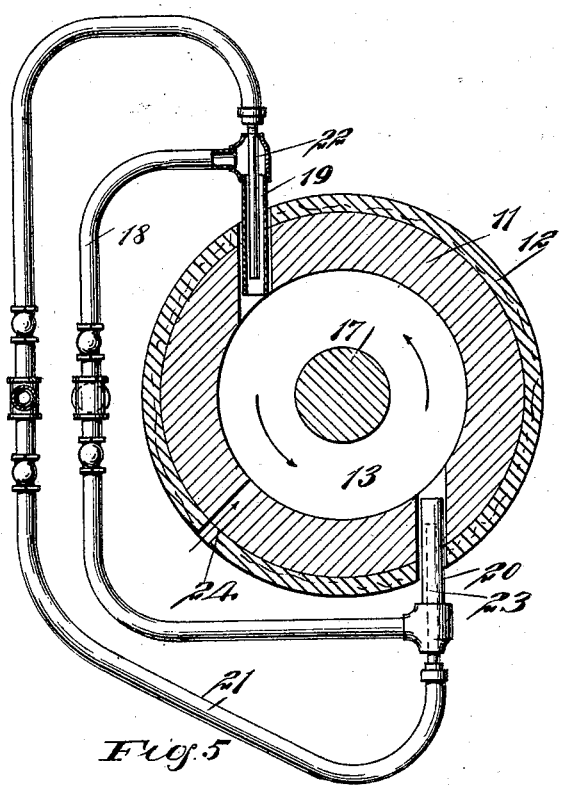
Figure 6:
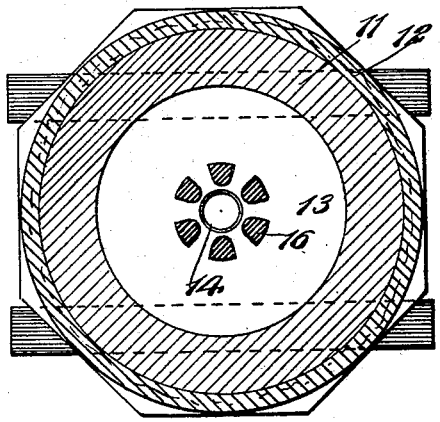

Figure 1 is a sectional elevation, on the line 1 1 of Fig. 2, of a coffee-roaster embodying our invention. Fig. 2 is a section on the line 2 2 of Fig. 1. Fig. 3 is a section on the line 3 3 of Fig. 2. Fig. 4 is a section on the line 4 4 of Fig. 2. Fig. 5 is a section on the line 5 5 of Fig. 2, and Fig. 6 is a section on the line 6 6 of Fig. 2.

The roaster comprises a cylinder 1, mounted to rotate in a frame 2. As here shown, the cylinder has at one end a tubular hub 3, which serves as a sight-opening, so that the contents of the cylinder may be observed, and at the opposite end it has a hub portion 4. The hub portion 3 rests upon rollers 5 and the hub portion 4 rests upon rollers 6. Attached to the frame 2 is an inlet-spout 7, through which coffee may be passed into the cylinder. At the opposite end there is also an inlet-spout 8, which leads through a flue 9, connecting the interior of the cylinder with a furnace 10. The furnace 10 has a wall 11, of refractory material, and preferably it will be provided with an asbestos jacket 12. In the lower portion of the furnace is a combustion-chamber 13, through the bottom wall of which a hot-air-supply pipe 14 leads. This hot-air-supply pipe is provided with a cut-off valve 15, and it communicates with the interior of the chamber 13 through spaces arranged between posts 16, extended from the bottom of the chamber and supporting a solid block 17 of refractory material. An air-pipe 18 communicates at one end with a tube 19, which leads into the combustion-chamber, and at the other end with a tube 20, which also leads into the combustion-chamber. A gas-supply pipe 21 has a burner-tube 22 extended into the pipe 19 and a burner-tube 23 extended into the pipe 20. These tubes 22 and 23 are somewhat shorter than the pipes 19 and 20, so that the gas and air may be thoroughly mingled before passing into the combustion-chamber. This mingled gas and air may be ignited by passing a lighting device through an opening 24 in the wall of the furnace.

Arranged above the combustion-chamber 13 are radial bars 25, consisting of fire-brick or other suitable material, and between these radial bars the hot air passes and thence through the spaces between bars 26 and 27, supported on the bars 25, the said series of bars 26 and 27 being placed at right angles to each other, as plainly indicated in Fig. 3. The hot air passes from the heating device through the flue 9 into the cylinder 1, and the amount of air passing thereto may be regulated by a gate-valve 28, arranged to slide over the inner end of the flue 9. A sight-tube 29, extended through the upper wall of the furnace, affords a means for observing the condition of the heating-bars of the furnace.

In operation the cylinder 1, containing the coffee to be roasted, is to be kept in constant rotation. The ignited gas in the combustion-chamber will heat the several bars 25, 26, and 27 practically to incandescence, so that the hot air passing from the pipe 14 will become heated to a very high degree by contacting with these bars while passing through the spaces between them. This wholly-heated air will of course enter the cylinder 1, thoroughly drying and roasting the coffee without danger of burning the same. The block 17 will also be heated practically to incandescence, and it is obvious that this block, with the several bars, provide a large heating area over which the air must pass.

In using the direct flame of either gas or coal for roasting purposes if the flame is brought in direct contact with the material being roasted any impurities in the flame are at times deposited on the material being roasted and injures the product. By using the furnace described the products of combustion are deposited therein, and the air (previously heated) being admitted to the furnace is superheated on its passage through the furnace and passes therefrom into the roasting-cylinder at a temperature sufficiently high to uniformly roast the material and is perfectly free from impurities that would injuriously affect it.

Having thus described our invention, we claim as new and desire to secure by Letters Patent—

1. A coffee-roaster, comprising a cylinder for containing the coffee, a furnace having communication with the interior of said cylinder, gas and air pipes leading into a combustion-chamber in the lower portion of the furnace, and bars placed radially in the furnace above the combustion-chamber, the said bars being of refractory material, substantially as specified.

2. A coffee-roaster, comprising a rotary cylinder for containing the coffee, a furnace having communication with the interior of said cylinder, gas and air pipes leading into a combustion-chamber in the lower portion of the furnace, bars placed radially in the furnace above the combustion-chamber, and cross-bars arranged above the radial bars, all of said bars being of refractory material, substantially as specified.

3. A coffee-roaster, comprising a cylinder for containing the coffee, a furnace communicating with the interior of the cylinder, gas and air supply pipes communicating with a combustion-chamber in the lower portion of the furnace, a hot-air pipe leading through the bottom of the furnace and into said chamber, a block of refractory material supported on spaced bars in the chamber and through the openings between which air from the hot-air-supply pipe is designed to pass, radial bars in the furnace above the combustion-chamber, and cross-bars arranged above the radial bars, the several bars being of refractory material, substantially as specified.

4. A coffee-roaster, comprising a cylinder for receiving the coffee, a furnace communicating with the interior of said cylinder, gas and air supply pipes leading into a combustion-chamber in the lower portion of the furnace and at opposite sides thereof, the outlet ends of the gas-pipes being within the air-pipes, a hot-air-supply pipe leading into said chamber, variously-arranged heating-bars placed above the combustion-chamber, and a valve for controlling communication between the furnace and the cylinder, substantially as specified.

In testimony whereof we have signed our names to this specification in the presence of two subscribing witnesses.

CHARLES WATSON.
ALVER GOLDMAN LOTZ.

Witnesses:
HENRY A. VAN DYNE,
JAMES WATSON.